(12) United States Patent
Dayt

(10) Patent No.: US 8,087,127 B2
(45) Date of Patent: Jan. 3, 2012

(54) CASTOR FOR A PIECE OF FURNITURE OR THE LIKE

(75) Inventor: Patrick Dayt, Besancon (FR)

(73) Assignee: Bruandet SA, La Barre (FR)

( * ) Notice: Subject to any disclaimer, the term of this patent is extended or adjusted under 35 U.S.C. 154(b) by 401 days.

(21) Appl. No.: 12/159,209

(22) PCT Filed: Nov. 9, 2006

(86) PCT No.: PCT/FR2006/002493
§ 371 (c)(1),
(2), (4) Date: Jun. 26, 2008

(87) PCT Pub. No.: WO2007/074221
PCT Pub. Date: Jul. 5, 2007

(65) Prior Publication Data
US 2008/0301904 A1    Dec. 11, 2008

(30) Foreign Application Priority Data

Dec. 29, 2005 (FR) ...................................... 05 13436

(51) Int. Cl.
*A47B 91/00* (2006.01)
*B60B 33/00* (2006.01)

(52) U.S. Cl. .................. 16/47; 16/21; 16/31 R; 16/35 R; 16/45; 188/1.12

(58) Field of Classification Search .................. 16/18 R, 16/20, 21, 38, 49, 29, 31 R, 35 R, 47, 45, 16/39; 188/1.12; 248/346.11; 301/5.305, 301/111.06
See application file for complete search history.

(56) References Cited

U.S. PATENT DOCUMENTS

| | | | | |
|---|---|---|---|---|
| 3,733,648 | A * | 5/1973 | Asberg et al. | 16/21 |
| 4,649,595 | A * | 3/1987 | Shane | 16/18 CG |
| 4,854,008 | A * | 8/1989 | Kuo | 16/30 |
| 4,941,552 | A | 7/1990 | Screen | |
| 5,119,525 | A * | 6/1992 | Melara | 16/18 R |
| 5,276,941 | A * | 1/1994 | Chen | 16/47 |
| 5,355,550 | A * | 10/1994 | Yang | 16/44 |
| 5,617,934 | A * | 4/1997 | Yang | 188/1.12 |
| 6,092,262 | A * | 7/2000 | Lin | 16/35 R |
| 6,193,324 | B1 * | 2/2001 | Chang | 301/111.05 |
| 6,256,835 | B1 * | 7/2001 | Wang | 16/35 R |

(Continued)

FOREIGN PATENT DOCUMENTS

DE       197 20 574 C       1/1999

(Continued)

*Primary Examiner* — Victor Batson
*Assistant Examiner* — Emily Morgan
(74) *Attorney, Agent, or Firm* — Young & Thompson

(57) ABSTRACT

A plurality of castors for a piece of furniture, each castor including a casing, two wheels, and fastener elements for fastening to the piece of furniture. The casing is made up of two units, each made as a single piece, the first unit including a portion constituted by a portion of the wheel casing and a portion constituted by a portion of the swivel casing, the second unit including a portion constituted by another portion of the wheel casing and a portion constituted by another portion of the swivel casing. The two units are adapted to be associated with each other to form the casing in such a manner that the portions of the first unit and the portions of the second unit engage respectively one in the other, and elements are provided for securing the two units together.

17 Claims, 8 Drawing Sheets

U.S. PATENT DOCUMENTS

| | | | |
|---|---|---|---|
| 6,532,624 B1 * | 3/2003 | Yang | 16/35 R |
| 6,588,059 B1 * | 7/2003 | McCord | 16/30 |
| 6,615,448 B2 * | 9/2003 | Melara | 16/35 R |
| 6,834,746 B1 * | 12/2004 | Lin | 188/1.12 |
| 7,200,895 B2 * | 4/2007 | Dayt | 16/47 |
| 7,406,745 B2 * | 8/2008 | Chou | 16/35 R |
| 2002/0178540 A1 * | 12/2002 | Holbrook et al. | 16/18 R |
| 2003/0150080 A1 * | 8/2003 | Yang | 16/47 |
| 2003/0160080 A1 | 8/2003 | Yang | |
| 2005/0108851 A1 * | 5/2005 | Dayt | 16/31 R |
| 2005/0115021 A1 * | 6/2005 | Tsai | 16/31 R |
| 2006/0156511 A1 * | 7/2006 | Li | 16/20 |
| 2008/0258540 A1 * | 10/2008 | Hicks et al. | 301/111.01 |

FOREIGN PATENT DOCUMENTS

| | | |
|---|---|---|
| EP | 1 527 905 A2 | 5/2005 |
| FR | 2 622 150 A | 4/1989 |

* cited by examiner

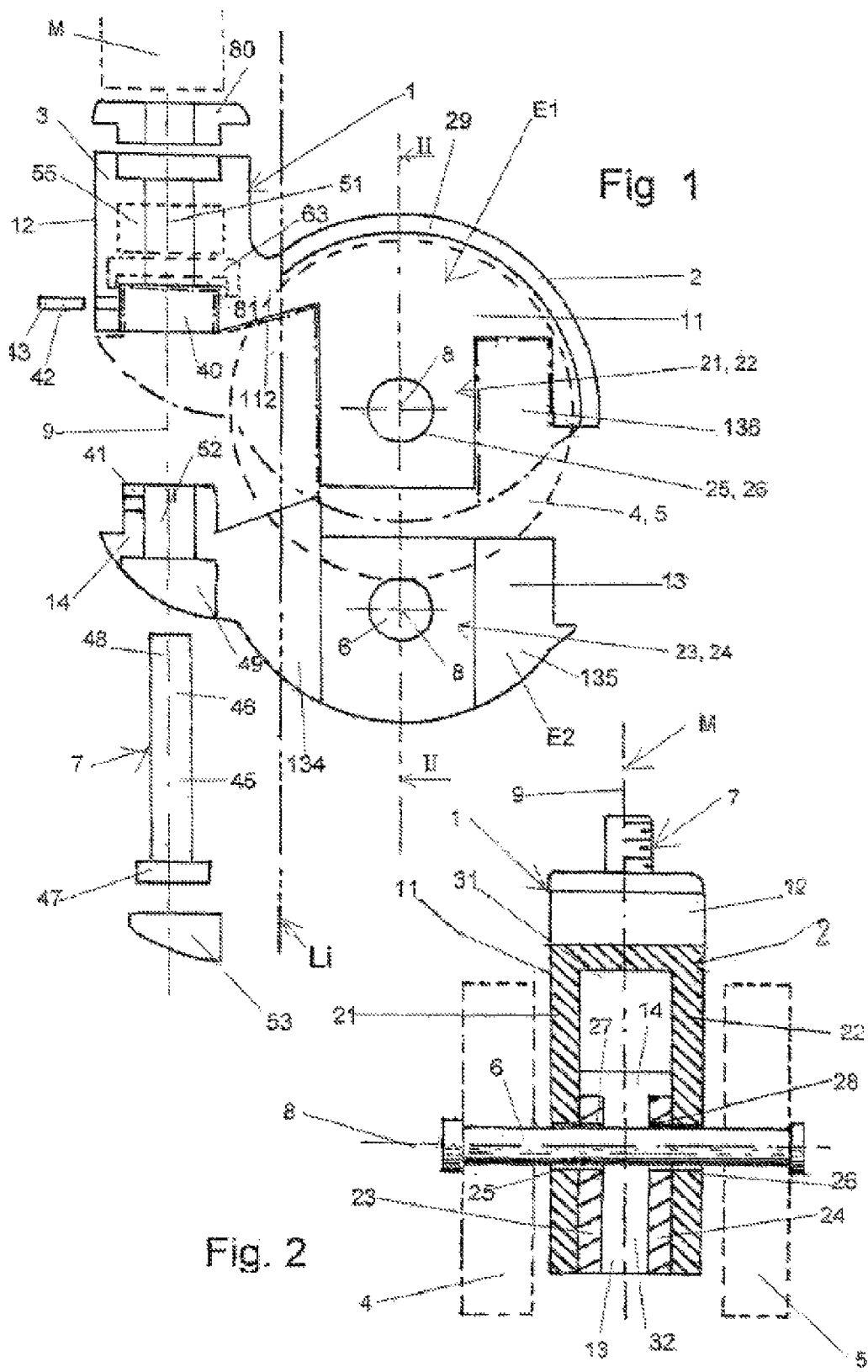

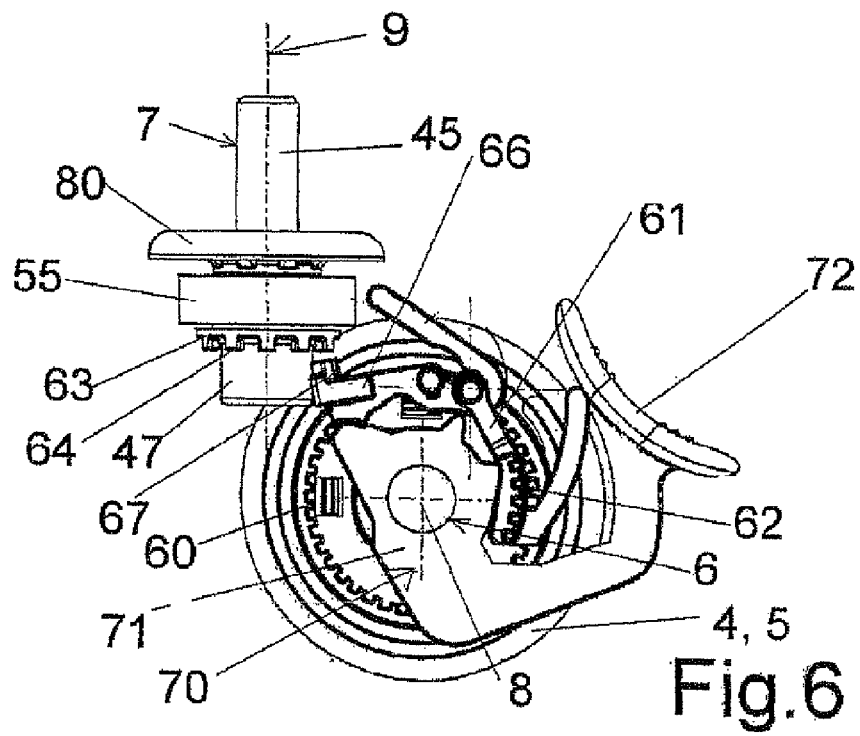
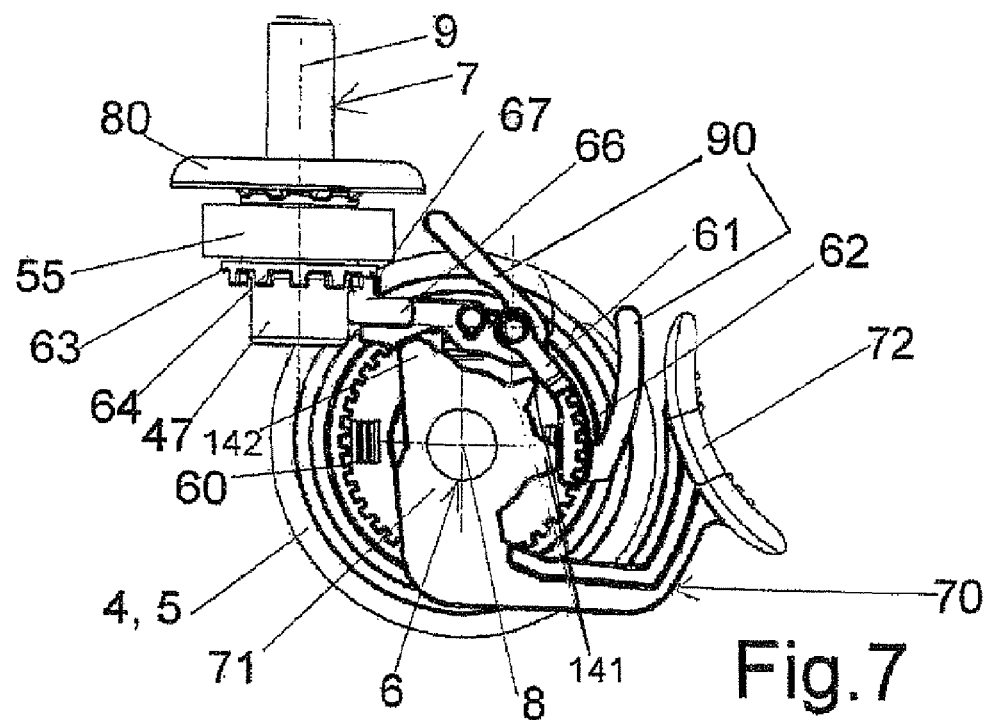

CASTOR FOR A PIECE OF FURNITURE OR THE LIKE

BACKGROUND OF THE INVENTION

1. Field of the Invention

The present invention relates to castors for a piece of furniture or the like, each castor comprising a casing constituted by a wheel casing for supporting and protecting wheels, and defining a first axis about which the wheels rotate, and a swivel casing for pivotally supporting the connection between the wheel casing and the piece of furniture and defining a second axis about which the casing can pivot relative to the piece of furniture, two wheels mounted to rotate relative to the wheel casing via a rotary shaft on the first axis, and fastener means for fastening the swivel casing to the piece of furniture. In general, such castors also include means for blocking them against movement in rotation relative to the piece of furniture on which they are mounted.

2. Description of the Related Art

Many such castors find a particularly advantageous application in making it easier to move beds, chairs, tables, carts, etc. in a hospital or the like. They are thus of a structure that is designed so as to minimize traps for dust or the like and so as to enable them to be cleaned thoroughly using disinfectant cleaning materials without damaging their parts that contribute to proper use of the castors, essentially the rotary axis of the wheels and the pivot axis, and also the means for blocking the castors relative to the piece of furniture on which they are mounted.

There are numerous types of castor that seek to achieve the above-mentioned objects, however in practice there are no castors that present a structure that makes it possible simultaneously to achieve those objects and that are also easy to assemble and easy to mount on furniture.

SUMMARY OF THE INVENTION

An object of the present invention is thus to provide a castor having a structure that tends to satisfy the above-mentioned objects.

More precisely, the present invention provides a castor for a piece of furniture or the like, the castor comprising a casing comprising a wheel casing defining a first axis for rotation of the wheels, said wheel casing serving to support the wheels, and a swivel casing defining a second axis that is substantially perpendicular to the first axis and about which the casing can pivot, two wheels mounted to rotate relative to the wheel casing via a rotary shaft on said first axis, and means for fastening the swivel casing to pivot relative to the piece of furniture, the castor being characterized by the fact that said casing is constituted:

by first and second units, each unit being made as a single piece, said first unit comprising a first portion constituted by a portion of the wheel casing and a second portion constituted by a portion of the pivot (or swivel) casing, said second unit comprising a third portion constituted by another portion of the wheel casing and a fourth portion constituted by another portion of the swivel casing, and the two units being suitable for being associated with each other to form the casing in such a manner that the first and third portions engage mutually to form the wheel casing and the second and fourth portions engage mutually to form the swivel casing; and by means for securing said two units together.

BRIEF DESCRIPTION OF THE DRAWINGS

Other characteristics and advantages of the invention appear from the following description given with reference to the accompanying drawings that are provided by way of nonlimiting illustration, and in which:

FIG. 1 is a diagrammatic cutaway view showing the principle of an embodiment of a castor of the invention, continuous lines showing the castor unassembled and dashed lines showing the castor after assembly;

FIG. 2 is a diagrammatic section view of the assembled castor as shown in the diagram of FIG. 1, the section being on a plane referenced II-II in FIG. 1;

FIGS. 3 and 4 are two exploded views in perspective showing an industrial embodiment of a castor of the invention, FIGS. 3A-3C being fully exploded views, while FIG. 4 is a partially exploded view in which some of the component elements of the castor are already assembled together;

FIGS. 6 and 7 are two views of an embodiment of a castor including wheel locking and swivel means, the locking means being shown in FIG. 6 in their position in which they allow the castor to run and to swivel, whereas FIG. 7 shows them in their position serving to prevent the castor from rotating or swivelling.

DETAILED DESCRIPTION OF THE INVENTION

Figure 3A:
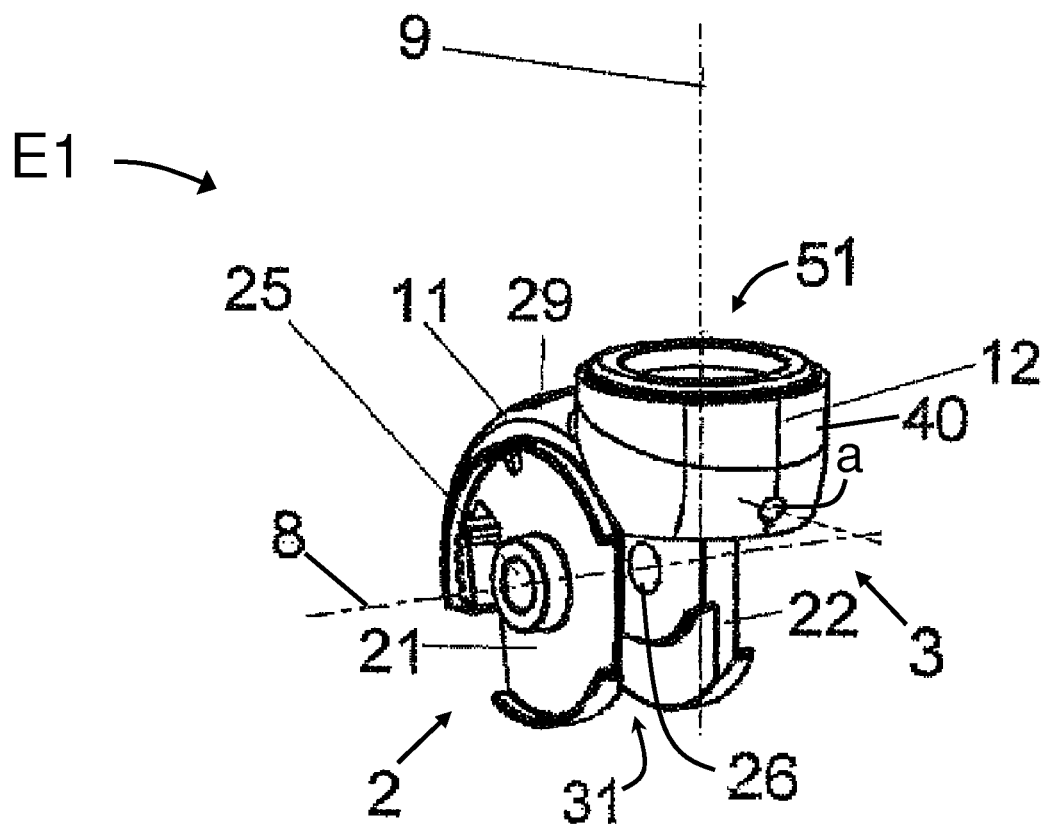

Firstly, it is specified that in the figures the same references designate the same elements, regardless of the figure on which they appear and regardless of the way in which the elements are shown. Similarly, if elements are not specifically referenced in one of the figures, their references can easily be found by referring to another figure.

The present invention relates to a castor for a piece of furniture M or the like, the castor comprising: a casing 1 generally comprising both a wheel casing 2 that defines a first axis of rotation 8 for the wheels of the castor, there usually being two wheels, the wheel casing serving both to support and to protect the wheels, and also a swivel casing 3 that defines a second axis 9 about which the casing can swivel, which second axis is substantially perpendicular to the first axis 8; two wheels 4 and 5 mounted to rotate relative to the wheel casing 2 via a rotary shaft 6 about the first axis 8; and fastener means 7 for mounting the swivel casing 3 pivotally to the piece of furniture M.

Such a castor is more particularly, but not exclusively, for use in hospital or analogous surroundings, for mounting on a piece of furniture such as a bed, a chair, a table, a cart, etc.

According to a characteristic of the invention, the above-defined casing 1 is made up of first and second units $E_1$ and $E_2$, each of the two units being made as a single piece, e.g. by molding or the like, and out of a material such as a plastics material or the like.

The first unit $E_1$ comprises a first portion 11 constituting a portion of the wheel casing 2, and a second portion 12 constituted by a portion of the swivel casing 3, the first and second portions 11 and 12 being united at 112 to form the unit $E_1$ that is obtained as a single piece by molding.

The second unit $E_2$ comprises a third portion 13 constituted by another portion of the wheel casing 2, and a fourth portion 14 constituted by another portion of the swivel casing 3, the third and fourth portions 13 and 14 being united at 134 so as to form the unit $E_2$ that is obtained as a single piece by molding.

The two units $E_1$ and $E_2$ are configured to be suitable for being associated with each other so as to form the casing 1 in such a manner that the first and third portions 11 and 13 engage mutually to form the wheel casing 2, and the second and fourth portions 12 and 14 engage mutually to form the swivel casing.

The castor also has means for securing together the two units $E_1$ and $E_2$ after they have been mutually engaged one with the other.

Figure 3B:
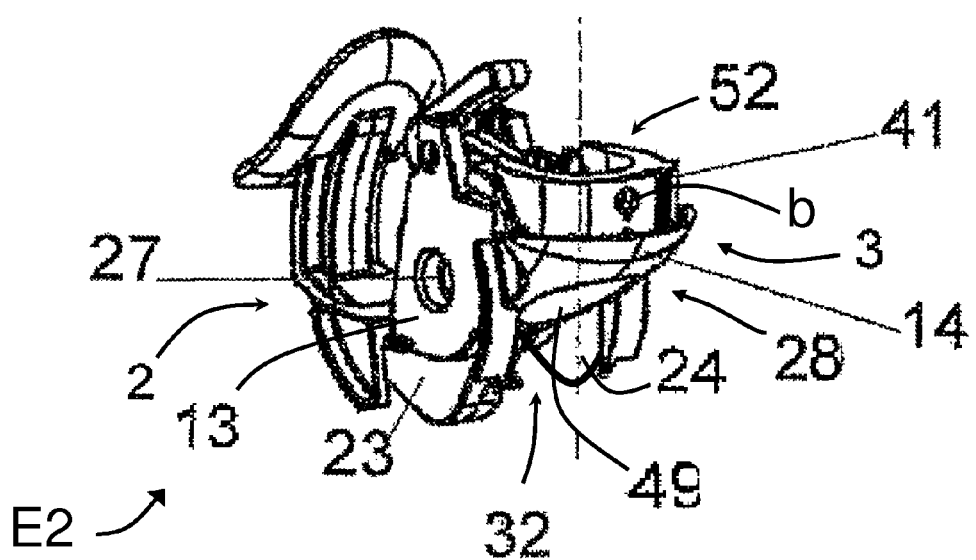
Figure 3C:
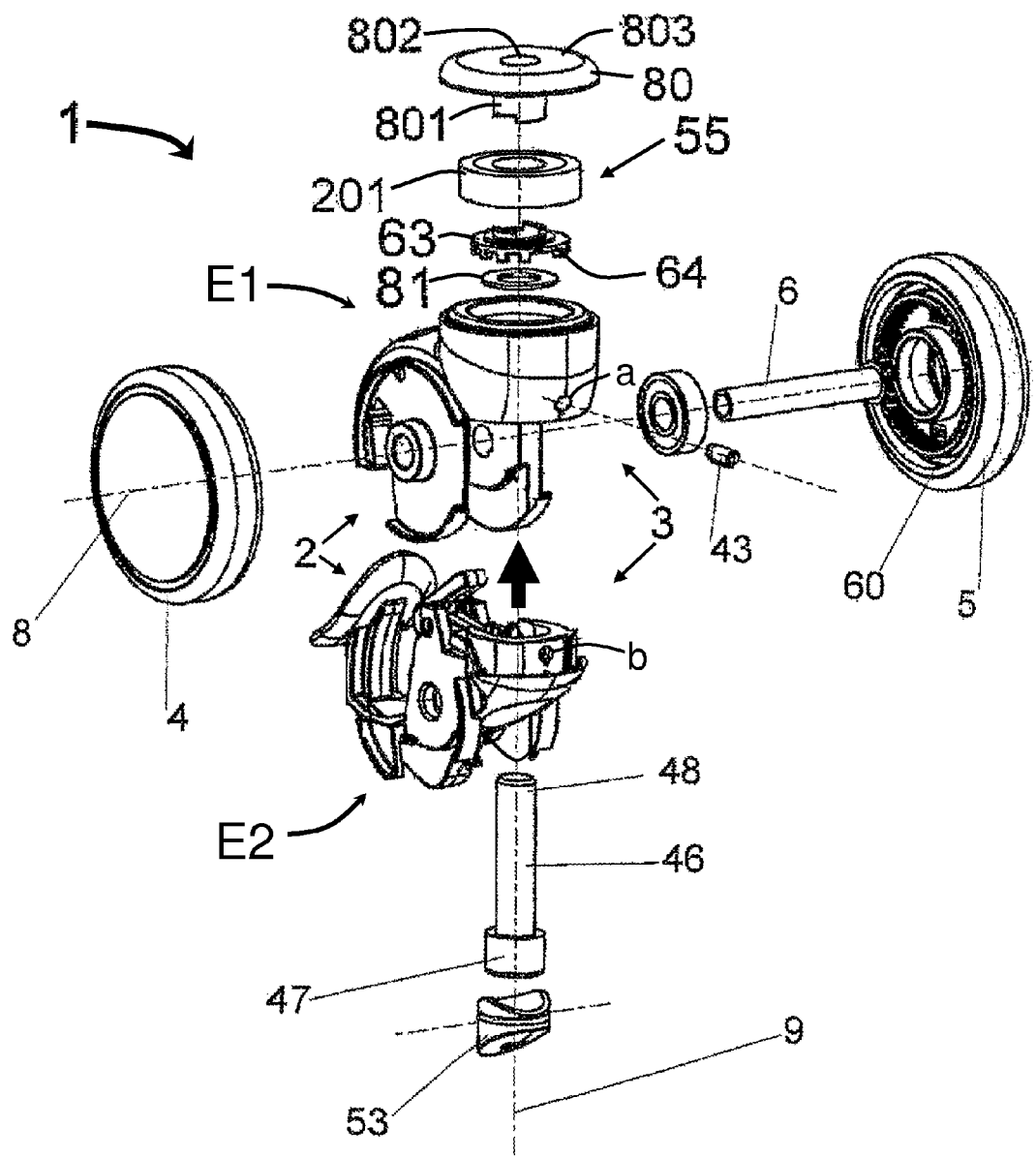

In an advantageous embodiment, such as that shown in the figures accompanying the present description, and more particularly in FIGS. 2 and 3, the first portion 11 comprises first and second walls 21 and 22 that are substantially parallel to each other defining a first substantially U-shaped space 31. These first and second walls are substantially perpendicular to the first axis 8 and parallel to the second axis 9, and by way of example they are secured to an arcuate yoke 29 that is generally in the form of half a circular cylinder, which in known manner is sandwiched between the two wheels 4, 5. Such a yoke 29 is itself known and is therefore not described in greater detail herein, merely for the purpose of simplifying the present description.

Each of the two walls 21 and 22 has a respective orifice 25, 26, the two orifices being centered on the first axis 8 and being of section complementary to the cross-section of the rotary shaft 6.

The third portion 13 comprises third and fourth walls 23 and 24 that are substantially parallel and that together define a second space 32 that is likewise substantially U-shaped. These third and fourth walls 23 and 24 are connected at 134 to the fourth portion 14.

Preferably, each of these third and fourth walls 23 and 24 can be bordered on its side remote from the connection 134 by a respective reinforcing wall 135, which reinforcing walls can co-operate with corresponding housings 136 formed in the first portion 11, as shown and partially visible in FIG. 1.

These third and fourth walls are substantially perpendicular to the first axis 8 and parallel to the second axis 9. They are also arranged in such a manner as to be engageable in the first space 31, and each has a respective orifice 27, 28, these two orifices being of a section that is substantially complementary to the cross-section of the rotary shaft 6 and being suitable for being centered on the first axis 8 when the first and second portions are engaged one within the other.

Advantageously, the sets of walls 23, 24 of the third portion 13 can be configured to form a first slideway portion suitable for receiving in translation a second slideway portion constituted by the first and second walls 21, 22 of the first portion 11. This configuration makes it possible to avoid the first and third portions 11, 13 turning relative to each other when they are mutually engaged.

Figure 4:
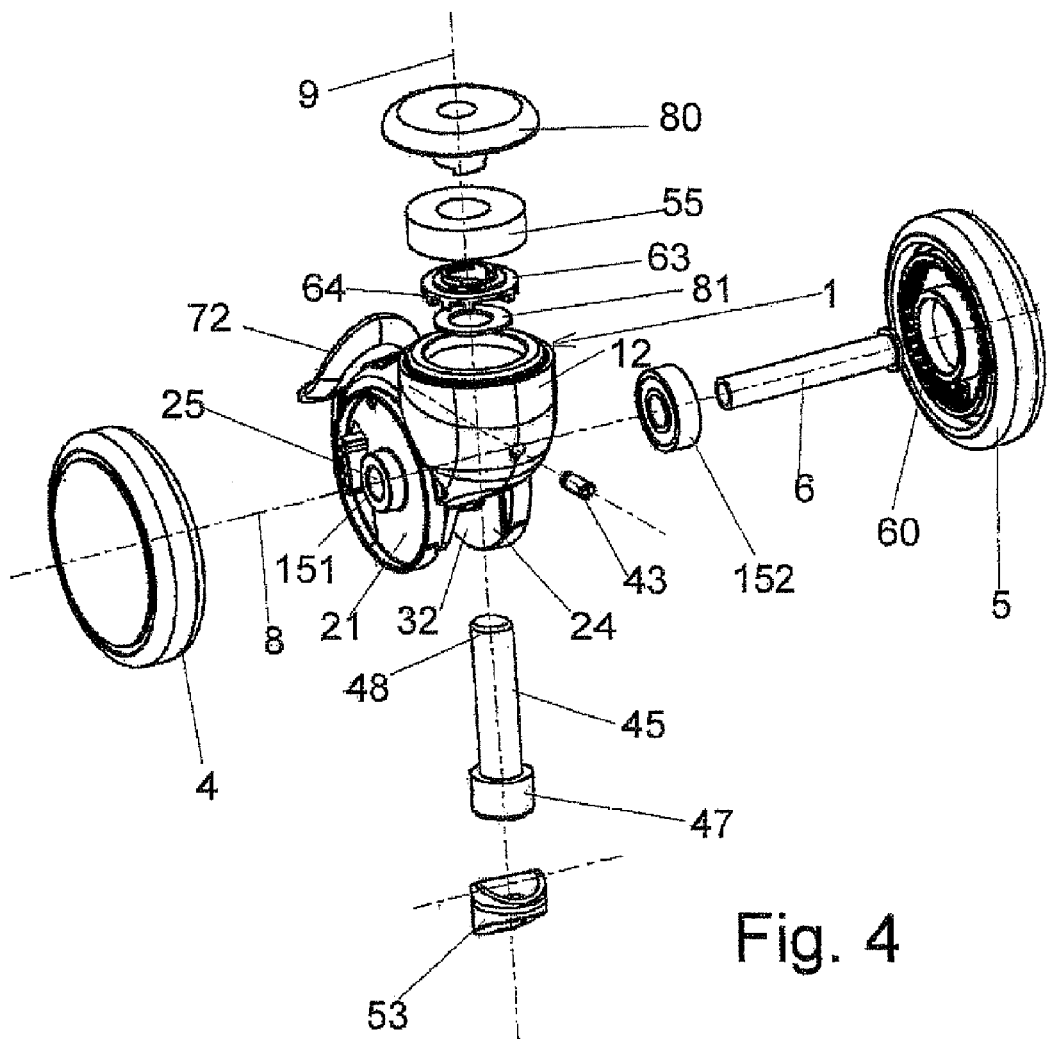

Preferably, and as shown in FIGS. 1, 3, and 4, the second and fourth portions 12 and 14 are engaged one in the other along the second axis 9 via a male-female engagement, the second portion 12 including the female engagement element 40 and the fourth portion 14 including the complementary male element 41. In continuous lines, FIG. 1 shows the castor in an unassembled configuration, the male and female elements 41 and 42 being spaced apart from each other, and in a combination of continuous lines and interrupted lines, the same figure shows the same castor in an assembled configuration, i.e. after the two units $E_1$ and $E_2$ have been engaged one in the other and the male and female elements 41 and 40 plugged together.

As mentioned generically above, the castor also has securing means for securing the two units $E_1$ and $E_2$ together after they have been engaged one in the other. These securing means are advantageously constituted firstly by the fact that the rotary shaft 6 passes through the four orifices 25-28 so that it constitutes pin means holding together the first and third portions 11 and 13, and secondly by means 42 for securing the male and female elements 41 and 40 to each other by male-female engagement between the second and fourth portions 12 and 14.

In this configuration, the rotary shaft 6 and the slideway co-operation between the first and third portions 11, 13 ensure that the two portions are held together securely.

Figure 5:
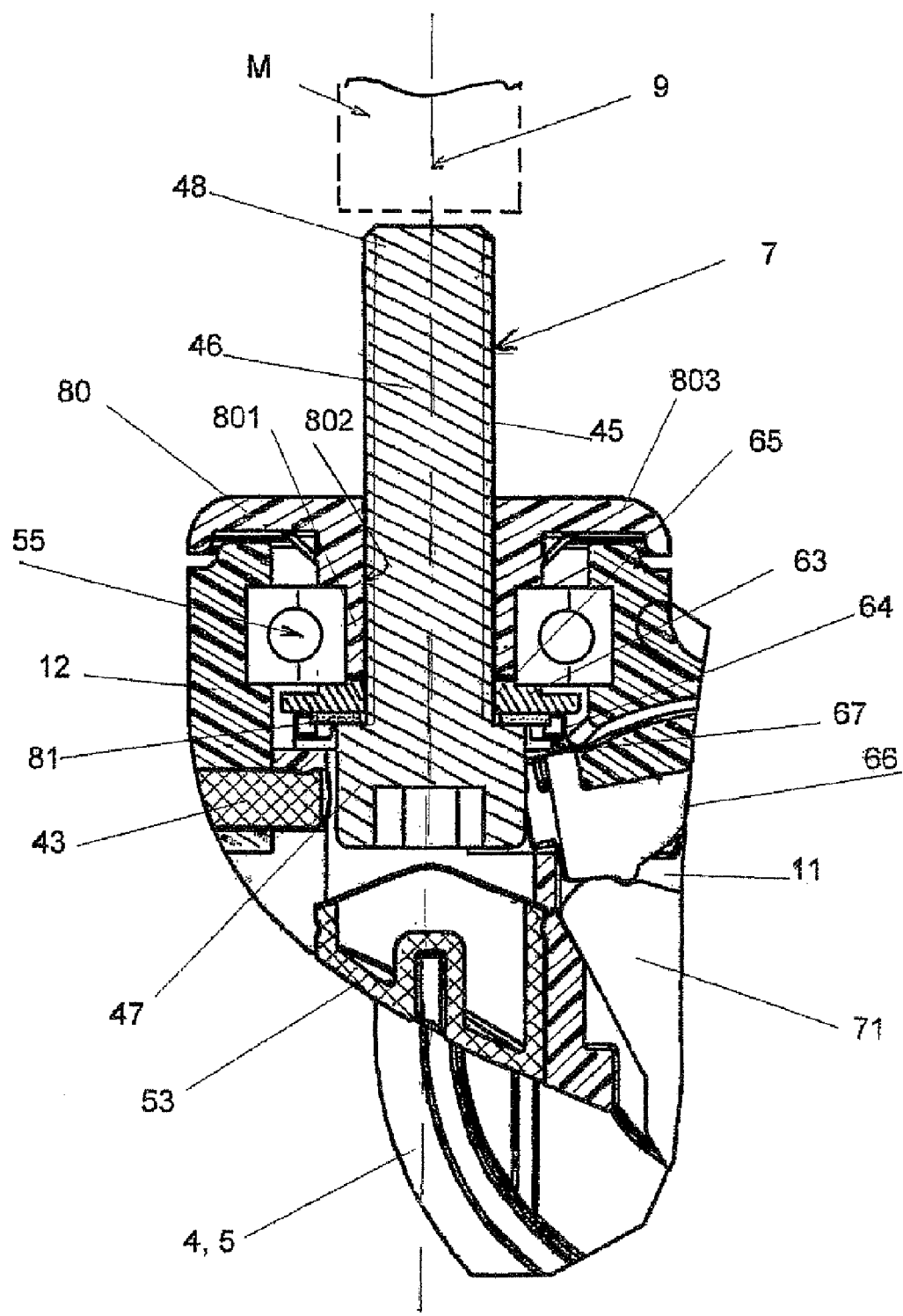
FIG. 5 is a section view of a portion of the castor of the invention matching the embodiment shown in FIGS. 1 to 4, this castor portion corresponding to the is portion that is situated on the left of the line Li in FIG. 1.

The means for securing the male and female elements 41 and 40 together are advantageously constituted by a pin 43, e.g. in the form of a peg or the like that is preferably a force-fit in through holes a and b, respectively, in the second and fourth portions 12, 14, these holes being in axial alignment when the male and female elements 41 and 40 are engaged one in the other, see more particularly FIGS. 1, 3, and 5.

The means 7 for fastening the swivel casing 3 to the piece of furniture M are constituted by two holes 51, 52 made along the second axis 9, respectively in the second portion 12 and a fourth portion 14, together with a fastener screw 45 comprising a screw-threaded shank 46 and a shoulder-forming head 47 secured to one end of the screw-threaded shank, the screw being suitable for being passing through the two holes 51, 52 so that the free end 48 of the screw-threaded shank 46 emerges beyond the end of the hole 51 formed in the second portion 12 that is furthest from the fourth portion 14 (and possibly beyond the cover 803 of the cap 80 described below), and in such a manner that the shoulder head 47 is situated in a bore 49 formed in the fourth portion 14 in axial alignment with the hole 52 formed in said fourth portion.

The bore 49 opens out to the end of the hole 52 in the fourth portion 14 remote from the end that is closest to the second portion 12, the depth of the bore 49 being greater than the height of the shoulder head 47.

The fastener means 7 also include means for providing a rotary connection between the screw-threaded shank 46 and the swivel casing 3 formed by assembling together the second and fourth portions 12, 14.

Preferably, the means for providing a rotary connection between the screw-threaded shank 46 and the swivel casing 3 formed by assembling together the second and fourth portions 12, 14 comprise bearing means 55 mounted to co-operate with the second portion 12, these bearing means being arranged in such a manner that the swivel casing 3 is free to pivot about the screw-threaded shank 46.

Figure 8:
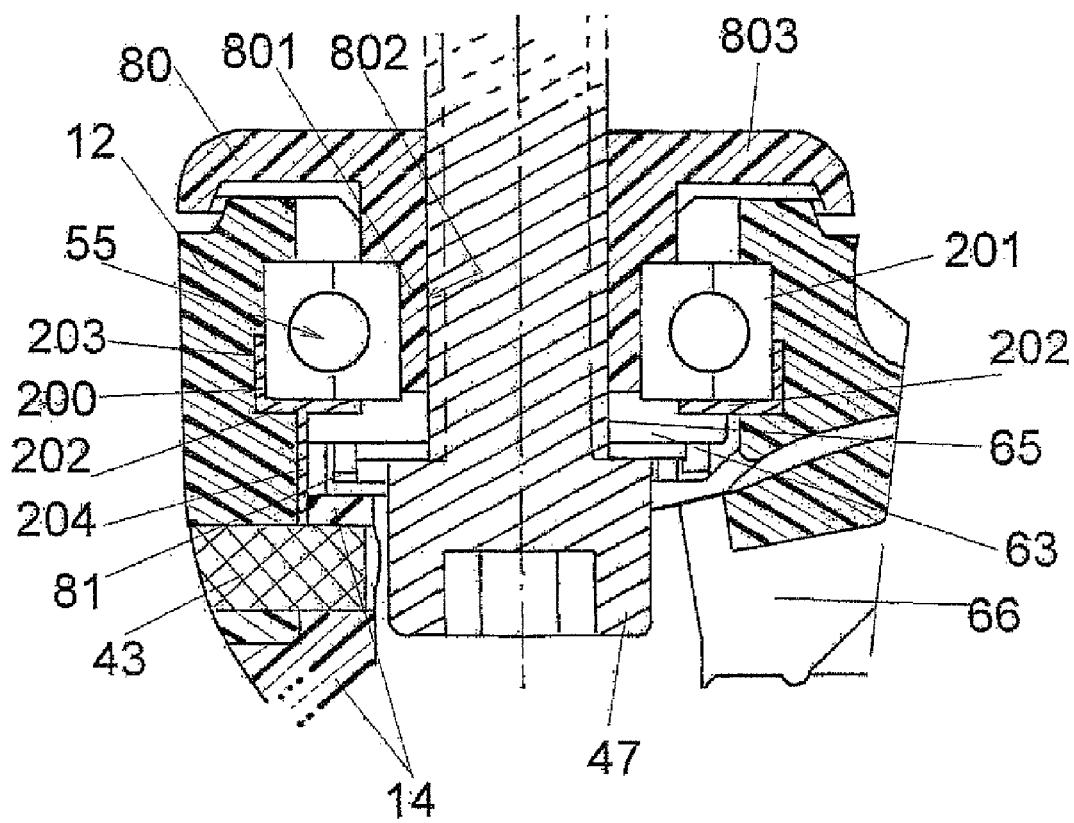
FIG. 8 shows a detail of an improved embodiment of the castor of the invention suitable for conducting static electricity.

The bearing means 55 are advantageously constituted by a ball, needle, or like rolling bearing that comprises, in conventional manner: a cage 201 made up of two half-cages which, when assembled together, surrounding the balls, needles, or the like, specifically an "outer", first cage secured to the second portion 12, e.g. being embedded therein when it is molded and being centered on the axis 9, and an "inner", second cage through which the screw-threaded shank 46 is passed during assembly (FIG. 5), advantageously via the projecting portion 801 of the cap 80 that is described below (FIG. 8).

The bearing means are constituted by a rolling bearing with two cages as described above, in order to connect the screw-threaded shank 46 with the inner cage of the bearing and to provide sealing around the fastener screw. By way of example, the castor may include a sealing cap 80 that is advantageously constituted (see FIG. 5) by a cover 803 suitable for covering the top of the second portion 12, by a projecting portion 801 on the cover 803, and by a central orifice 802 passing through the cover 803 and the projecting portion 801. The central orifice 802 of the cap presents a section that is substantially equal to, and advantageously slightly smaller than, the cross-section of the screw-threaded shank 46, and the projecting portion 801 is arranged to be suitable for being fitted by force between the screw-threaded shank 46 and the inner bearing cage so as to provide a sealing function in the second portion 12 of the sealing gland type.

The cover 803 and the projecting portion 801 of the cap 80 serve to ensure that a liquid, possibly an aggressive and corrosive liquid of the kind that might be used for cleaning the floor in a hospital, cannot penetrate into the castor by trickling through the hole 51.

In order to protect the fastener screw 45 against dust and other polluting elements, the castor also includes a plug 53 for closing the bore 49 when the shoulder head 47 is in position therein (see FIG. 5).

In non-essential but generally preferable manner, depending on the applications of such castors, a castor of the invention includes blocking means, firstly for blocking rotation of at least one wheel 4, 5 relative to the casing 1, and secondly for blocking pivoting of the casing relative to the fastener screw 45.

Numerous embodiments of these blocking means can exist, for example those described and shown in DE 197 20 574.

Nevertheless, in a preferred embodiment and as shown in greater detail in FIGS. 6 and 7, these means for blocking both rotation of at least one wheel 4, 5 relative to the casing 1 and also swivelling of the casing relative to the fastener screw 45, comprise first teeth 60 formed on the wheel 4, 5 that is to be blocked, a first lever 61 mounted to pivot on the first portion 11, one end of the first lever 61 having second teeth 62 that are complementary to the first teeth 60, the first lever being mounted to pivot between first and second positions so that in a first position, the second teeth 62 penetrate into the first teeth 60, and in the other position, the second teeth 62 do not co-operate with the first teeth 60.

These blocking means also comprise a crown ring 63 having third teeth 64 at its periphery, this crown ring being mounted to rotate freely about the second portion 12 coaxially about the hole 51 made in said second portion 12. It has a central orifice 65 (see FIG. 5) so that the screw-threaded shank 46 can engage therein and be held in place by any appropriate means, the crown ring being positioned to co-operate with the second portion 12 between the bearing means 55 and the shoulder head 47.

The blocking means also comprise a bearing washer 81 (FIGS. 3 and 4) in particular for avoiding premature wear of the crown ring 63, this bearing washer being interposed between the crown ring 63 and the shoulder head 47, in a configuration that is described below.

The locking means include a second lever 66 with one end of the second lever having fourth teeth 67, the second lever 66 being mounted to pivot between first and second positions on the third portion 13 in such a manner that, in a first position, the fourth teeth 67 penetrate into the third teeth 64, while in the second position, the fourth teeth 67 do not co-operate with the third teeth 64.

Finally, the blocking means include means 70 for causing the two levers 61 and 66 to pivot between their respective second and first positions, and controllable return means for returning both levers from their first positions to their second positions.

Preferably, these means 70 for causing the first and second levers 61 and 66 to pivot between their respective second and first positions comprise a cam 71 provided with projections 141, 142 and mounted to pivot about the rotary shaft 6 by means of a through orifice, the cam being placed in the second space 32, together with means 72 for causing the cam 71 to pivot in such a manner as to cause the projections 141, 142 to move and thereby cause the first and second levers 61 and 66 to pivot between their respective second and first positions. When the cam is returned to its original position, it releases the two levers, which can then be returned to their second position, as explained above.

It is emphasized that in order to illustrate the operation of these blocking means, FIG. 6 shows the castor in the non-blocked position, while FIG. 7 shows it in the blocked position, with the teeth being mutually engaged as described above.

The controllable return means for returning the two levers 61, 66 from their first positions towards their second positions are constituted essentially by resilient tabs 90 acting between the first portion 11 and respective one of the two levers 61 and 66 so as to urge them towards their second positions in which the teeth 62 and 67 of the two levers do not co-operate with the teeth 60 and 64 respectively of the wheels 4, 5 and of the crown ring 63. The two levers can be returned to their second positions when the cam 71 is not acting on them to hold them in their first positions.

The castor of the invention is assembled and mounted on the piece of furniture M as follows:

It is assumed that the castor is in a unassembled configuration, as shown in FIG. 3.

Firstly the above-described blocking means are assembled as follows: the lever 61 is mounted on the first portion 11 with the resilient tab 90 bearing against the inside wall of the first portion 11. The lever 66 is mounted on the third portion 13.

The units $E_1$ and $E_2$ are then assembled together by being mutually engaged, and as a result the tab 90 of the lever 66 comes to bear against the inside wall of the first portion 11. The cam 71 is then inserted into the space 32 of the third portion 13 between the two walls 23 and 24, and is positioned in such a manner that its through orifice is centered on the axis 8 and the projections 141 and 142 are ready to co-operate in sliding respectively against the levers 61 and 66 so as to cause them to pivot about their respective pivot axes.

The castor is then in a configuration as shown in FIG. 4. The crown ring 63 and the bearing washer 81 are then inserted, in that order, into the hole 51 in the female element 40, it being specified that the crown ring 63 has its teeth 64 pointing in a direction suitable for co-operating with the teeth 67 of the lever 66 and that it needs to be positioned in such a manner as to come advantageously into firm abutment against, or at least partially in, in the inner cage of the bearing 55. In this way, the crown ring 63 is situated between the inner cage of the bearing 55, and the bearing washer 81.

At this stage of assembly, the two wheels are pre-positioned on either side of the wheel casing 2, and more particularly on either side of the walls 21 and 22, possibly with projecting bearing surfaces or the like 151, 152 being interposed, as shown.

Then, the rotary shaft 6 including a shoulder at one of its ends is passed through the orifices 25-28 in the walls 21-24, through the bearings 151, 152, and through the journals in the wheels 4, 5 and the central orifice in the cam 71, the nonshouldered end of the shaft then being crimped to the journal of the wheel with which it co-operates.

The screw-threaded shank 46 is inserted in the hole 52 and then in the hole 51. It is subsequently screwed into the piece of furniture M, after previously taking care to place the cap 80 between the top of the swivel casing 3 and the piece of furniture, as described above. The screw is then tightened, e.g. using a hex-headed key, as shown in FIG. 5, and suitable for co-operating with the shoulder head 47. The screw-threaded shank 46 is screwed until the shoulder head 47 is received in the bore 49 and the castor is securely fastened to the piece of furniture M.

While being inserted by passing through the crown ring 63, the screw-threaded shank 46 becomes secured, e.g. as a force-fit or by any other means, to said crown ring 63.

In this way, when the teeth 67 of the lever 66 mesh with the teeth 64 of the crown ring 63, the casing 1 is prevented from pivoting relative to the screw-threaded shank 46. Since the screw-threaded shank is considered as being stationary relative to the piece of furniture M, the casing 1 of the castor is thus prevented from swivelling relative to the piece of furniture M.

Finally, the plug 53 is pushed into the bore 49 so as to plug the hole 52, as described above.

The advantages of such a castor structure, both in terms of assembly and mounting on a piece of furniture, and in terms of use in surroundings such as a hospital, can be seen clearly on reading the present description, without it being necessary to specify them here.

As described above, castors of the invention are for supporting and moving pieces of furniture which, in certain fields, are likely to become charged with static electricity.

In order to avoid any incident or accident due to such static electricity, it is necessary for the pieces of furniture to be electrically grounded. One of the means for obtaining such a grounding connection comprises making use of the castors by making them electrically conductive since they are always in contact with the floor that constitutes electrical ground.

The castor of the invention makes it very easy to perform this function. For this purpose, at least one of the following elements: the cap 80; the second casing portion 12; the third casing portion 13; the fourth portion 14; and at least one of the wheels 4, 5 is made of a plastics material that is filled with an electrically conductive filler e.g. metal fibers, so as to make the element electrically conductive, the element being connected to the floor and to the piece of furniture by any means that are likewise electrically conductive.

In an advantageous embodiment, and as shown in FIG. 8, said means are constituted by the fact that the cage 201 and the rotary shaft 6 are made of electrically conductive metal material, and the cap 80, the third casing portion 13, and at least one of the two wheels 4, 5 are made of a plastics material filled with metal fibers. In addition, the castor includes a connection piece 200 made of an electrically conductive material that is in contact with the cage 201 and the third casing portion 13, thereby electrically connecting them.

In a preferred embodiment, the connection piece 200 is constituted by a ring 202 mounted in contact within the cage 201, between said cage and the crown ring 63, and at least two first and second tabs 203, 204 secured to the ring 202 on either side thereof so that the first tab 203 comes into contact with the cage 201 via the outer cage and the second tab 204 comes into contact with the third casing portion 13, being sandwiched between the second casing portion 12 and said third casing portion 13 (see FIG. 8).

In this embodiment, any static electricity charging the piece of furniture can thus be conducted to floor ground by following a path that comprises in succession: the cap 80 against which the piece of furniture rubs; the bearing in contact with the cap 80 via its inner cage; the connection piece 200 in contact with the outer cage 201 in particular via the ring 202 and the first tab 203; the third casing portion 13 (or the unit $E_2$) in contact with the second tabs 204 of the connection piece 200; the shaft 6 that is in contact with said third casing portion 13; and at least one of the wheels 4, 5 made of an electrically conductive material and rubbing against the shaft 6 while also running on the floor.

What is claimed is:

1. A castor for a piece of furniture, the castor comprising:
a castor casing having a wheel casing defining a first axis for rotation of and supporting wheels, a swivel casing defining a second axis that is substantially perpendicular to the first axis and about which the castor casing can pivot, said wheels mounted to rotate relative to the wheel casing via a rotary shaft on said first axis, and means for fastening the swivel casing to allow the swivel casing to pivot,
wherein said castor casing comprises:
first and second units, each unit being made as a single piece, said first unit comprising a first portion of the wheel casing and a second portion of the swivel casing, said second unit comprising a third portion of the wheel casing and a fourth portion of the swivel casing, the first and second units forming the castor casing such that the first and third portions engage to form the wheel casing and the second and fourth portions engage to form the swivel casing;
the first portion comprises first and second substantially parallel walls defining a first space, the first and second walls being substantially perpendicular to the first axis and parallel to the second axis, each having a respective orifice centered on said first axis and having a cross section that is complementary to a cross-section of the rotary shaft;
the third portion comprises third and fourth substantially parallel walls defining a second space therebetween, the third and fourth walls being substantially perpendicular to the first axis and parallel to the second axis, said third and fourth walls being arranged to be plugged into the first space, each of the third and fourth walls having a respective orifice centered on said first axis and having a cross section that is complementary to the cross-section of the rotary shaft, and
means for securing said two units together,
wherein the rotary shaft passes through the orifices of the first, second, third, and fourth walls.

2. A castor according to claim 1, wherein the second and fourth portions engage each other along said second axis via male-female engagement, the second portion including the female element and the fourth portion including the male element, further including means for securing the male and female elements together between the second and fourth portions.

3. The castor according to claim 2, wherein the means for securing the male and female elements together comprises a pin inserted into through holes respectively in the second and fourth portions, said holes being in axial alignment when the male and female elements are engaged one in the other.

4. The castor according to claim 1, wherein the means for fastening the swivel casing to the piece of furniture comprises:

two holes formed respectively in the second and fourth portions, the two holes extending along said second axis; and a fastener screw comprising a screw-threaded shank and a shoulder head secured to one end of the screw-threaded shank, said screw engaging the two holes such that a free end of the screw-threaded shank emerges beyond an end of the hole formed in the second portion that is furthest from the fourth portion, and such that the shoulder head is situated in a bore formed in the fourth portion in axial alignment with the hole formed in the fourth portion, said bore opening out to an end of the hole in the fourth portion opposite from the end that is closest to the second portion, and a depth of said bore being greater than a height of said shoulder head; and said swivel casing is formed by assembling together the second and fourth portions.

5. The castor according to claim 4, comprising bearing means mounted to cooperate with said second portion, said bearing means being arranged such that the swivel casing can pivot freely relative to the screw-threaded shank.

6. The castor according to claim 5, further comprising a plug for closing said bore when the shoulder head is positioned therein.

7. The castor according to claim 6, further comprising means for blocking rotation of at least one of said wheels and pivoting of the castor casing.

8. The castor according to claim 7, wherein the means for blocking rotation of at least one wheel relative and pivoting of the castor casing comprises:

first teeth formed on the at least one of said wheels;

a first lever mounted to pivot on said first portion, one end of said first lever having second teeth complementary to the first teeth, said first lever being mounted to pivot between first and second positions such that in the first position, the second teeth engage the first teeth, and in the second position, the second teeth do not engage the first teeth;

a crown ring including third teeth, said crown ring being mounted to co-operate with the second portion on a same axis as the hole formed in said second portion and including a central orifice enabling said screw-threaded shank to pass therethrough, said crown ring positioned to engage the second portion between the bearing means and the shoulder head;

a bearing washer between said crown ring and the shoulder head;

a second lever, one end of said second lever having fourth teeth, said second lever being mounted to pivot between first and second positions on said third portion such that in the first position, the fourth teeth engage the third teeth, and in the second position, the fourth teeth do not engage the third teeth;

means for causing both levers to pivot between their respective second and first positions; and controllable return means for returning both levers from their first positions towards their second positions.

9. The castor according to claim 8, wherein the means for causing the first and second levers to pivot between their respective second and first positions comprise:

a cam mounted to pivot about the rotary shaft, said cam being disposed in the second space; and means for causing said cam to pivot so the first and second levers pivot between their respective second and first positions.

10. The castor according to claim 5, further comprising a sealing cap comprising a cover suitable for covering the top of the second portion, a projecting portion on the cover, and a central orifice passing through the cover and the projecting portion, said central orifice presenting a cross section that is substantially equal to the cross-section of the screw-threaded shank.

11. The castor according to claim 5, wherein said bearing means comprise a cage having outer and inner cages, said outer cage being secured to the second portion and the inner cage having the screw-threaded shank passing therethrough, said cap comprising:

a cover suitable for covering the top of the second portion;

a projecting portion on the cover; and a central orifice passing through the cover and the projecting portion, said central orifice being of section that is substantially equal to the cross-section of the screw-threaded shank, and said projecting portion suitable for being engaged as a force-fit between the screw-threaded shank and the inner cage of the bearing.

12. The castor according to claim 11, wherein at least one of the cap, the second portion, the third portion, and at least one of the wheels is made of a plastics material filled with an electrically conductive filler.

13. The castor according to claim 12, wherein said cage and the rotary shaft are made of an electrically conductive metal material, the cap, the third portion, and at least one of the wheels being made of a plastics material filled with metal fibers, and a connection piece of electrically conductive material contacts and electrically connects said cage and said third portion.

14. The castor according to claim 13, wherein said connection piece includes a ring mounted in contact with said cage, between said cage and said crown ring, and at least first and second tabs secured to said ring on either side thereof so that the first tab contacts the cage and the second tab contacts the third casing portion.

15. The castor according to claim 1, wherein the second and fourth portions engage each other along said second axis via male-female engagement, the second portion including the female element of said male-female engagement and the fourth portion including the male element.

16. The castor according to claim 2, wherein the means for fastening the swivel casing to the piece of furniture include:

two holes formed respectively in the second and fourth portions, the two holes extending along said second axis;

a fastener screw comprising a screw-threaded shank and a shoulder head secured to one end of the screw-threaded shank, said screw engaging in the two holes such that a free end of the screw-threaded shank emerges beyond an end of the hole formed in the second portion that is furthest from the fourth portion, and that the shoulder head is situated in a bore formed in the fourth portion in axial alignment with the hole formed in the fourth portion, said bore opening out to an end of the hole in the fourth portion opposite from the end that is closest to the second portion, and a depth of said bore being greater than a height of said shoulder head; and said swivel casing formed by assembling together the second and fourth portions.

17. The castor according to claim 4, further comprising a sealing cap having a cover suitable for covering the top of the second portion, a projecting portion on the cover, and a central orifice passing through the cover and the projecting portion, said central orifice having a cross section that is substantially equal to a cross-section of the screw-threaded shank.

* * * * *